United States Patent [19]

Ralphs

[11] Patent Number: 4,698,006
[45] Date of Patent: Oct. 6, 1987

[54] APPARATUS FOR THE REACTION MOULDING OF PLASTICS MATERIALS

[75] Inventor: George T. Ralphs, Bradford-on-Avon, England

[73] Assignee: C. & J. Clark Limited, Somerset, England

[21] Appl. No.: 846,048

[22] Filed: Mar. 31, 1986

[30] Foreign Application Priority Data

Apr. 12, 1985 [GB] United Kingdom ............... 8509366

[51] Int. Cl.⁴ .............................................. A04J 21/00
[52] U.S. Cl. .................................... 425/185; 425/190; 425/209; 425/228; 425/229
[58] Field of Search ........................... 366/77, 87, 186; 425/185, 190, 206, 209, 376 B, 192 S, 228, 229

[56] References Cited

U.S. PATENT DOCUMENTS

| 3,389,433 | 6/1968 | Vicini | 425/190 X |
| 4,065,241 | 12/1977 | Orlowski | 425/228 |
| 4,169,679 | 10/1979 | Miller et al. | 366/87 X |
| 4,219,319 | 8/1980 | Gater et al. | 425/229 |

FOREIGN PATENT DOCUMENTS 0034262 3/1976 Japan .................................. 425/145
0859169 8/1981 U.S.S.R. ............................... 425/206

Primary Examiner—Charles Hart
Attorney, Agent, or Firm—Wenderoth, Lind & Ponack

[57] ABSTRACT

Apparatus for use in the reaction moulding of plastics materials in which two liquid components are mixed in a screw type or similar mixer. Mixed material is ejected or poured into a mould via a passageway which latter is one of a plurality of similar passageways arranged radially around a wheel. Each passageway remains in the lowermost (pouring) position for a period of time during which it is reckoned to remain in a satisfactory working condition, and the wheel is then automatically indexed to bring the next passageway into operation. Cleaning structure is employed to clean out the used passageways after a period of time known by experience to be sufficient for the material to be at least partially cured. In this way the passageways can be re-used in a continuous production machine. The length of time that each passageway remains in the pouring position is found from experience of the particular materials being used; it is found in practice that the passageway remains in a satisfactory working condition for about 60 seconds.

14 Claims, 5 Drawing Figures

APPARATUS FOR THE REACTION MOULDING OF PLASTICS MATERIALS

BACKGROUND OF THE INVENTION

This invention relates to apparatus for use in the reaction moulding of plastics materials, such as polyurethane or nylon, which initially consist of at least two liquid components which have to be mixed before introduction into a mould.

The components may be introduced into the mould by low pressure casting, in which the already-mixed components are literally poured into an open mould which is then closed with a lid after withdrawal of the casting head, or by injection moulding, in which the mixed components are injected into a closed mould. One machine for the injection moulding of plastics material is described in our British Pat. No. 1582248 and comprises an injection head incorporating a screw rotating in a bore which acts to intimately mix the components and also to eject the mixed components from a nozzle.

The casting method does, however, have advantages in certain circumstances over the injection method. In casting the pouring head can be moved across the mould during the pouring operation leading to a better distribution of material in the mould—in injection moulding the material is all introduced at one point. This improved distribution leads to fewer trapped air pockets on the surface of the finished article. Also the absence of a sprue in the casting technique means no wastage of material from this source.

In the reaction moulding of plastics materials, the materials expand after mixing to fill the mould into which they are introduced. There is a delay between the actual mixing of the material and the point at which this expansion commences. This delay is called the cream time of the material and the object of the exercise is to effect the transference of the mixed components into the mould before the cream time ends. After the cream time, the material must remain in the mould for sufficient time, called the in-mould time, for the material to have cured to an extent which permits its removal from the mould without damage. In a continuous production casting machine, problems can arise when the delay between the completion of one pour and the start of the next exceeds the cream time of the material.

This creates a situation whereby it is necessary to carry out a solvent flush procedure to purge the mixer and chamber of the creamed material before proceeding to the next pour. This is:
I. Time consuming;
II. Incurs the expense of a solvent;
III. Messy and creates solvent fumes.

It also imposes an unwanted discipline on the production process inasmuch as it governs the maximum time available between pours to the point where it is not unusual to proceed to the pour of the next moulding before the operator has completed his work, thus causing rejects, rather than going through the solvent flush sequence.

This situation has been exacerbated by the advent of the growing use of short in-mould time materials as there is a direct connection between their in-mould and cream times, for example a typical 2 minute in-mould material will have a cream time in the region of 8 seconds.

If an injection moulding machine such as that described in British Pat. No. 1582248 is adapted for use in the casting of materials problems arise in the keeping clean of the pouring passageway which must inevitably be provided in order to carry out the pouring operation.

Efforts have been made to overcome this difficulty by means, for example, of plunging a rod down the passageway after pouring to evacuate the residue of the material. Due however to the nature of the material, some will adhere to the rod tip, and to the exit end of the passageway. If this is not removed at frequent intervals, a build-up will take place, which will lead to a disturbance of the smooth flow of the material stream, essential to efficient mould filling, plus the danger of partially cured material dropping into the mould during the pouring operation, both situations producing reject mouldings.

Attempts have been made to overcome this problem by the use of wiping means, such as various types of rotary and blade cleaners. The difficulty then arises of a build-up of the partially cured material adhering to the wiping means itself, which must remain in efficient working condition for long periods, of say not less than 4 hours, without attention.

BRIEF SUMMARY OF THE INVENTION

The present invention seeks to overcome or reduce this problem by the provision of more than one passageway, together with means for indexing the passageways at regular intervals so that no one passageway remains in use for a time beyond which its pouring characteristics become imparied. Means are further provided for cleaning that passageway or passageways which are not currently in use so that, after such cleaning, the passageway becomes available for re-use. Thus, in a production machine, the employment of more than one passageway allows sufficient time to elapse between completion of use of a passageway for pouring, and its re-use, for the residue material to have cured to the extent that a cleaning operation can be carried out without it adhering to the passageway or to the cleaning means.

The minimum number of passageways required to do this will depend on the nature of the material being processed, which will affect the length of time that a given passageway remains in a satisfactory working condition, and also the time taken for the material to be sufficiently cured for it not to adhere to the passageway or cleaning means during the cleaning operation. In practice it is advisable to exceed the required minimum to ensure that a marginal situation does not arise. The geometry of the apparatus is such that it is convenient to employ 12 passageways indexed automatically on a time basis.

The passageways may be provided in any convenient manner. One advantageous system utilises a wheel in which the passageways are formed and wherein the passageways are indexed by stepwise rotation of the wheel to bring the passageways one by one into the operating position. The passageways may be oriented parallel with the axis of the wheel but in a preferred embodiment the passageways extend radially so that they can be used, in conjunction with a horizontal screw mixer, to pour material in a downwards direction into the mould. To do this, the pouring operation is carried out through the passageway situated at the bottom vertical position of the wheel. Other configurations will appear to those skilled in the art.

The passageways may be formed in the wheel as respective bores formed in the material of the wheel and completely surrounded by the material of the wheel—in other words closed in the circumferential direction of the bore. However, it has been found that removal of cured material from the bore during cleaning of the passageway is assisted if the bore is only part formed by the wheel itself—i.e. takes the form of an open groove formed in one surface of the wheel and wherein, as and when necessary for pouring, the groove is completed to form a closed bore by virtue of the fact that that surface of the wheel is biassed against a suitable further surface. This latter surface is preferably flat (giving a non-circular bore) for ease of cleaning.

The cleaning means comprises, in its basic form, a cleaning tool in the form of a plunger which is moved longitudinally into the bore in order to push out any build-up of cured material. For this purpose the bore is preferably open at both ends for cleaning. After ejecting cured material the plunger is retracted. After cleaning, the interior of the bore is sprayed with release agent to ensure that the materials do not adhere to the bore which would make effective cleaning difficult, if not impossible. Conveniently the cleaning plunger can itself be adapted for this purpose by incorporating a passageway having a nozzle at one end which may be caused to eject a spray of release agent during the aforesaid retraction of the plunger.

With the use of the wheel configuration described above, and incorporating 12 passageways, a suitable location for the plunger is after the wheel has gone through 270° of rotation after the pouring position. Each passageway will remain in an efficient working condition for at least 60 seconds when processing most materials, regardless of the number, frequency, or volume of pours carried out. Thus, for the configuration just described, this would allow for an interval of 8 minutes between the use of a passageway for the pouring operation and its cleaning. This is considerably in excess of the time required for any known material to reach a sufficiently cured state for the cleaning operation to be efficiently carried out, but it allows for certain situations for example where a machine incorporates a colour change system whereby the colouring medium is directly introduced into the mixing chamber together with the two material streams. In these circumstances it is advisable to change to a clean passageway when the colour is changed to avoid the previous colour contaminating the next moulding in the fresh colour.

As it is essential that the machine will run for long periods without attention, safeguards should be taken to ensure that a gradual build-up of cured material on the wheel does not take place. To this end, a scraping blade may be fitted to the surface of the wheel containing the open grooves. A knife may also be fitted on its rim in order to keep this area clean, and to facilitate the subsequent passageway cleaning operation by ensuring that there is no excess material covering the exit end of the passageway to interfere with the easy entry of the cleaning tool.

It is also advisable to apply a release agent in the areas of the wheel into which the material might come into contact. A device is therefore incorporated with the cleaning tool to spray the passageway after the removal of the unwanted material, a further device sprays the surface of the wheel containing the open slots, and its rim.

BRIEF DESCRIPTION OF THE DRAWINGS

In order that the invention may be better understood an embodiment thereof will now be described by way of example only and with reference to the accompanying drawings in which.

DETAILED DESCRIPTION OF THE PREFERRED EMBODIMENT

Figure 1:
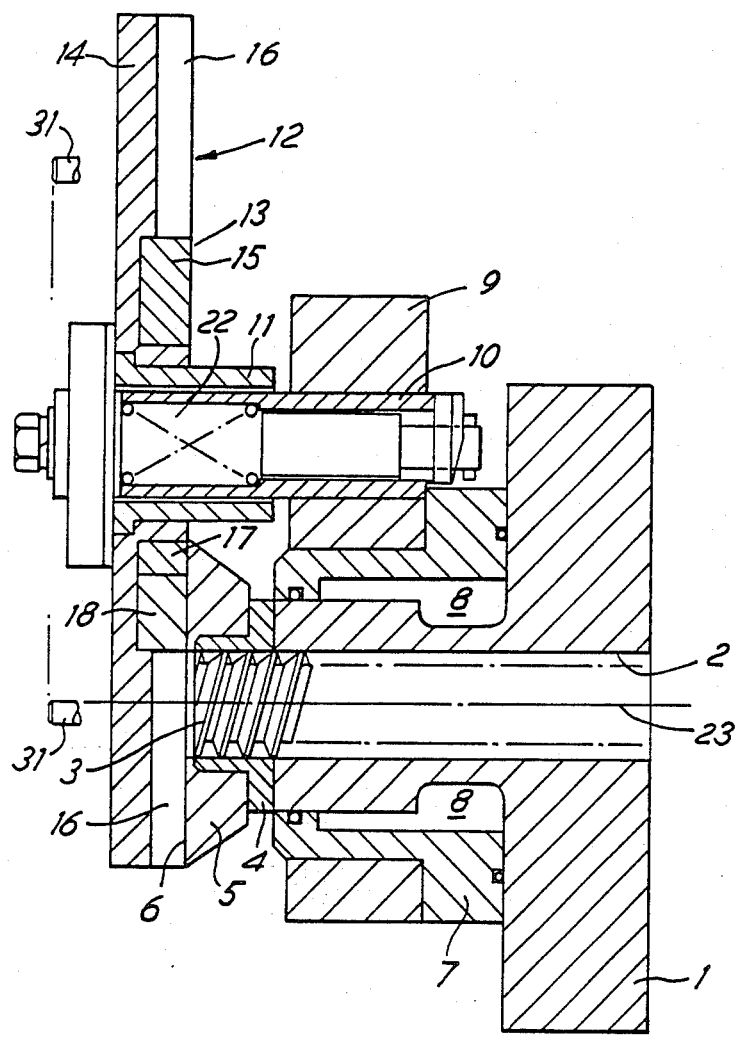
FIG. 1 is a sectional view through a pouring head assembly forming part of the apparatus of the present invention.

The pouring head assembly shown in the drawings forms part of a reaction moulding apparatus, for example of the type decribed in the aforementioned British Pat. No. 1582248. The apparatus described in this patent incorporates a screw mixer by means of which the components to be reacted together are intimately mixed and ejected under pressure from the end of the screw. This type of mixer is exemplary, however, and it is to be emphasised that alternative forms of mixing head could be used. All that is necessary for a performance of the present apparatus is that the mixed components be presented under pressure at an exit orifice or similar structure.

Referring to the drawings, there is shown a mixing head housing 1 having a bore 2 in which rotates a screw 3. The reaction components pass down the screw 3, from right to left in FIG. 1 and emerge, intimately mixed and under a small pressure, at a nozzle 4. Mounted on the nozzle 4 is a cap 5 of PTFE which is frusto conically shaped defining a flat front face 6. A water jacket 7 defines an annular passage 8 for water cooling.

Mounted on the water jacket 7 is a block 9 which has a bore in which is non-rotatably mounted an axle 10. Rotatably and slidably mounted about axle 10 is a boss 11 which forms part of a pouring wheel 12. The rear face 13 of the pouring wheel 12—that seen in FIG. 2—is spring loaded against the face 6 of the nozzle cap 5 by latching means incorporating a spring 22.

The pouring wheel 12 has two principal parts: a rotatable part 14 which is mounted on the boss 11 and is caused to rotate about axle 10, as will be explained, and a stationary part 15 which is positioned within an annular recess in the part 14 and which is locked against rotation by means not shown. The parts 14 and 15 are such as to together form a disc-shaped wheel having a generally planar rear face 13 which, as has been said, bears against the face 6 of the nozzle cap 5 to effect a substantially liquid-tight connection between the two.

The construction of the pouring wheel 12 will now be described in more detail with particular reference to FIGS. 2 and 3. It will be seen that the rotatable part 14 of the wheel has an annular outer portion when seen from the rear. Extending across this annular portion are a plurality (12 in this case) of radially extending grooves 16 spaced apart by 30°. The grooves are part-circular in lateral section as is clear from FIG. 3 which shows just a single groove. When closed off by the presence of nozzle cap 5, these grooves become, in turn, closed pouring passageways which are used for transferring mixed material emerging from the left-hand end of screw 3 (FIG. 1) into a downwards stream which is poured into a mould cavity (not shown).

The stationary part 15 of wheel 12 is itself in two parts: occupying the upper position, the major segmental part 17 and below it the minor segmental part 18. The lower part 18 is, like the cap 5, of PTFE and the presence of these two items biased into contact with one another ensures a good liquid seal at this point. The lower part 18 also acts to seal off the top end of that passageway currently in the pouring position. The position of the nozzle cap 5 with respect to the rear face of the wheel is illustrated in FIG. 2 by means of dotted lines. The upper part 17 is formed at its edge with a cut-out portion 19 which is positioned 270° away from the position of the centre 23 of the screw in the direction of rotation of the part 14 of the wheel, indicated by arrow A. With this arrangement, when one groove 16 extends vertically downwards (i.e. for pouring) the groove 270° away from this is in alignment with the cut-out portion 19. As reference to FIGS. 2 and 5 will show, the cut-out portion 19 is so shaped as to continue, as far as possible, the walls of the groove through a right-angle turn to open onto the rear face of the wheel. In this way, the contents of the groove 16 can be pushed out of the groove at the 270° position via the cut-out portion 19 by means of a plunger, to be described later. A deflector plate 20 may be provided to deflect material so ejected away from the working parts of the machine to be collected safely. an air jet from a pipe 21 may assist this process.

In operation of the machine the rotatable part 14 of wheel 12 is automatically indexed in the direction of arrow A by means to be described below. At each indexing, the part 14 is rotated by 30° and while stationary is locked in the position illustrated in the drawings—i.e. with one groove 16 extending vertically downwards in alignment with the centre of screw 3. The wheel remains in this position for a period of time and, during this period, several moulding operations may be carried out with material flowing from screw 3 through a right angle and down the groove 16 now, by virtue of cap 5, a closed passageway. The length of the pouring passageway does not seem to be too critical, although it has been noticed that very short lengths result in an output stream of material which spirals as it descends. In the illustrated embodiment the passageways are of 50 mm overall length with about 25 mm below the screw.

Each groove 16 stays in use for as long as it remains in an efficient working condition—i.e. without too much build up of material—and the wheel is then indexed by 30° to present the next groove to the end of the screw 3. In practice, and assuming that no colour changes take place, it has been found that each groove will remain in good condition for at least 60 seconds when processing most materials, and this is regardless of the number, frequency or volume of pours carried out within this period. Accordingly, if the time between indexing movements is set to a fixed 60 seconds, this will ensure that the pouring passageway is always in good working condition. In the event that a colour change takes place, the wheel should be indexed immediately to ensure that the previous colour remaining in the current passageway does not contaminate the first mouldings in the new colour.

Figure 2:
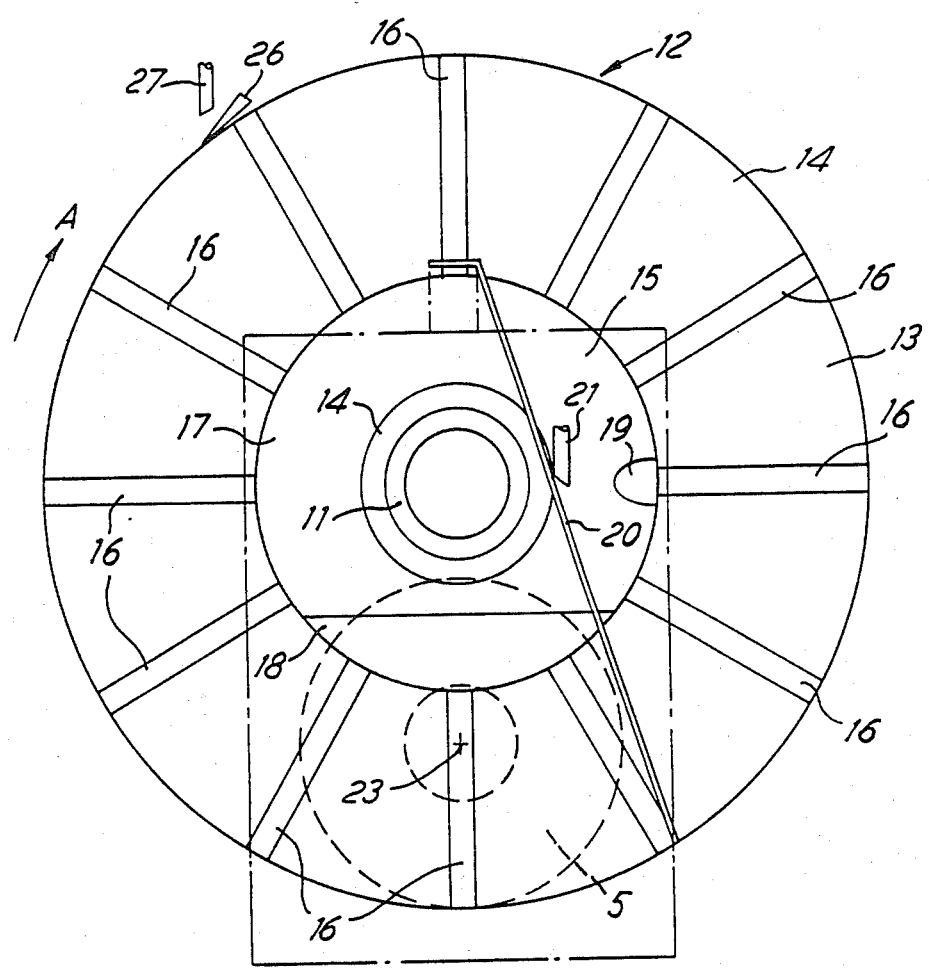
FIG. 2 is a rear view of the pouring wheel forming part of the assembly of FIG. 1.
Figure 3:
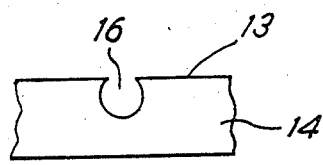
FIG. 3 is a partial section of one passageway in the wheel of FIG. 2.

As the wheel indexes around, the material which has collected in the groove 16 moves around also, curing as it goes. by the time the groove has reached approximately the ten o'clock position when seen in FIG. 2 the material within and around the groove is judged sufficiently cured to commence the cleaning operation by means of a peripheral trimming blade 26. Blade 26 bears against the rim of the wheel and is intended to clean off material which has collected around the output end of the passageway when in use. An air jet from a pipe 27 can be used to safely eject the material cut away.

The main cleaning operation is not carried out until the groove has rotated by 270° from its pouring position, and is in alignment with the cut-out portion 19. At this point a plunger moves horizontally into the groove 16, pushing the cured material out of the groove 16 and into the cut-out portion 19 where the waste material executes a right angle turn and falls away. At the same time a scraper blade moves across the rear face 13 of the wheel and acts to clean off the face in the area of the groove 16. Dispersal of waste material may be assisted by an air jet from pipe 21, followed by deflection out of harm's way by plate 20 (if fitted).

The wheel indexing and plunger mechanisms will now be described with particular reference to FIGS. 4 and 5.

The indexing means comprises a pneumatic cylinder 28 attached to the piston of which is an arm 29 having a bifurcated end 30, as shown, which acts to engage, one at a time, a plurality of pins 31 formed on the front face of the rotatable part 14 of wheel 12. In the particular embodiment illustrated, 12 pins 31 are provided, spaced apart by 30°. The cylinder 28 is mounted for rotation about a pivot point 32 fixed in relation to the main body of the machine (not shown), and has a ramp surface 33 along which may move a follower wheel 34.

The follower wheel 34 is mounted on the end of a vertical arm 35 extending upwardly from a horizontal arm 36 attached via a cross member 37 to the piston arm 38 of a further pneumatic cylinder 39. Mounted on the cross member 37 is the aformentioned plunger, shown under reference 40, and it will be noted that this is positioned in horizontal alignment with that groove 16 on the wheel 12 which occupies the 270° cleaning position. It will be noted that the plunger is hollow and has an end of slightly reduced cross section. This is intended to allow a supply of pressurised release agent liquid to be passed up the hollow interior of the plunger and to be ejected in the form of a spray from a sideways-directed pin nozzle 41.

Pivotally mounted on cross member 37 about an axis 44 is a scraper pin 42 which is likewise hollow and has a sideways-directed pin nozzle 43 which is also connected to a pressurised supply of release agent. The scraper pin 42 mounts a scraper blade 24 at the right hand end (FIG. 5) and a cam body 45 at the left hand end. Spring means (not shown) act to bias the pin 42 about axis 44 in a clockwise direction, this movement being constrained, in the position illustrated in FIG. 5, by the presence of a fixed block 46 against which the cam body presses.

Figure 4:
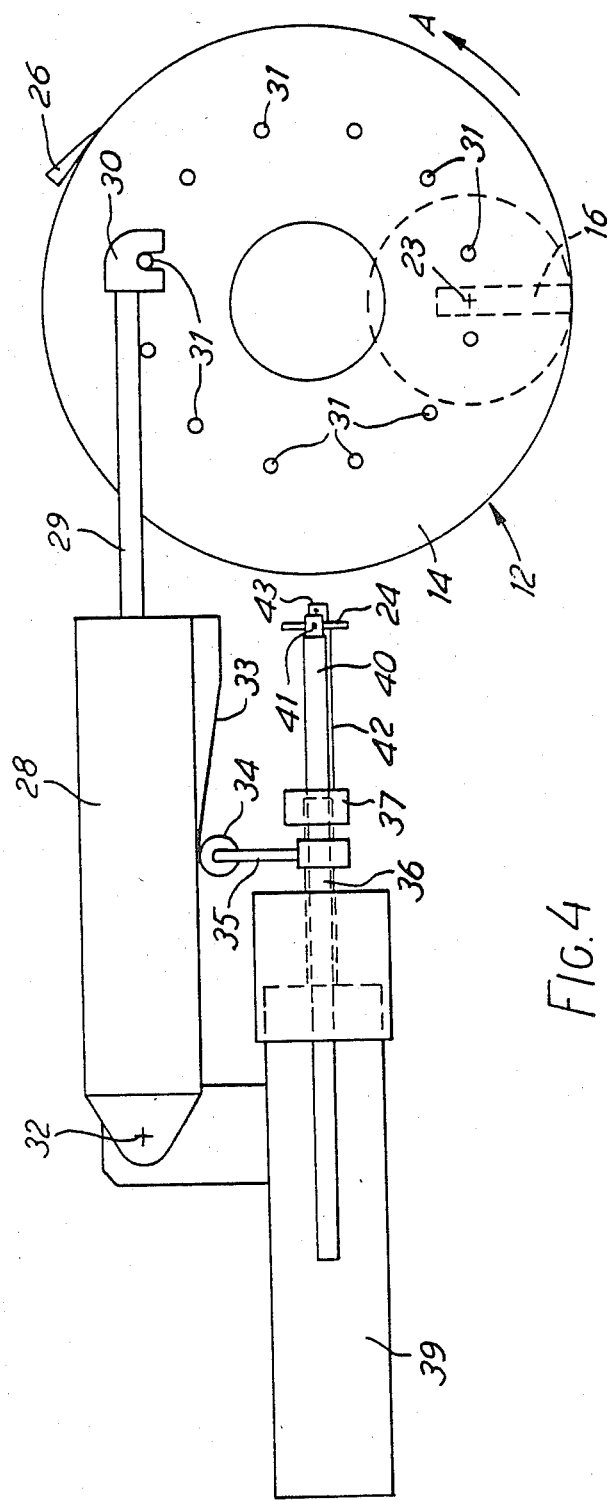
FIG. 4 is a front view of the pouring head assembly of FIG. 1.
Figure 5:
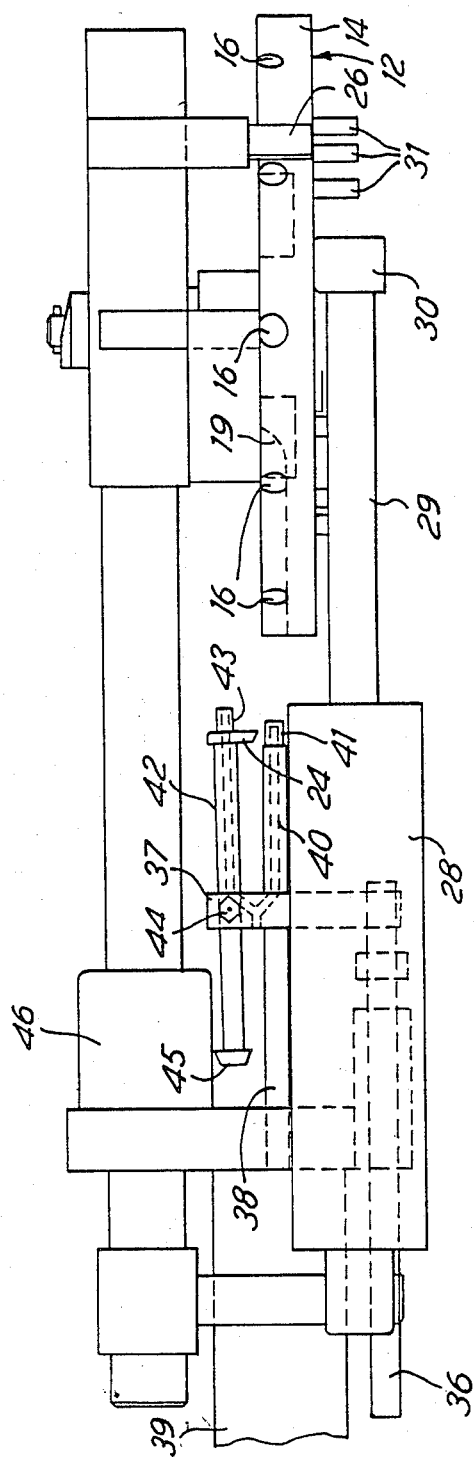
FIG. 5 is a plan view of the pouring head assembly of FIG. 1.

Operation is by the synchronised actuation of the pressure cylinders 28 and 39, the full sequence of operation being as follows:

Starting with the position shown in FIG. 4, which is the pouring position, it is assumed that the stationary eriod of the wheel (see above) is coming to an end. At the end of the preset period pouring is temporarily halted while indexing takes place. First, the cylinder 39 is actuated to push arm 38 and hence cross member 37 and arm 36 in a rightwards direction towards the wheel. The plunger 40 enters the groove 16 at the 270° position and pushes out waste material in the manner described above. At the same time, the scraper pin 42 moves rightwards and cam body 45 slides over the surface of block 46 until the end of the block is reached, whereupon the pin 42 rotates clockwise under spring pressure. The arrangement of cam body 45 and block 46 is such that this clockwise movement takes place after the scraper blade 24 has passed over the peripheral edge of wheel 12 so that the edge of the scraper blade becomes spring biassed against the rear face of the wheel. Movement of the blade 24 across the surface of the wheel acts to clean off the face in the area of the longitudinal opening formed by groove 16.

When the plunger 40 reaches the right hand end of groove 16, the arm 38 is retracted, causing the plunger 40 to withdraw from the groove. At the same time release agent is applied under pressure to the nozzles 41 and 43 to wet the interior of the groove and the back face of the wheel with release agent.

During the left to right movement of the arm 38, the roller 34 is likewise moved to the right, so that it rides up the slope 33 thereby causing the cylinder 28 to pivot anticlockwise about axis 32. This in turn causes the end 30 of arm 29 to rise and release the pin 31. The arrangement is such that, by the time pin 31 has been thus released, the plunger 40 has entered the 270° groove 16 thus ensuring that the part 14 of the wheel remains locked against rotation. When the end 30 has risen clear of pin 31, the cylinder 28 is then actuated to extend the arm 29 to the right to a position where the bifurcated end 30 lies directly above the next adjacent pin 31 in the clockwise direction.

As the plunger 40 withdraws, so the roller 34 rides down the slope 33 causing the cylinder 28 to rotate clockwise about pivot 32, and the end 30 to fall and eventually to capture the next pin 31. Once again, it is arranged that capture of the next pin 31 occurs before the plunger has finally withdrawn from groove 16 in order to ensure that the wheel remains locked against rotation.

Once the plunger 40 has fully retracted, the cylinder 28 is actuated to move arm 29 to the left, thus rotating the wheel anticlockwise (in FIG. 4) by 30° to the next pouring position.

All of the above operations can be carried out automatically, but with manual override if, for example, a colour change necessitates a shorter stationary period than would otherwise be the case. In addition the aforementioned air jets for clearing debris can likewise by synchronised in with the remaining operations so that air is supplied in a short sharp burst only when needed.

I claim:

1. Apparatus for the reaction moulding of plastics materials, said apparatus comprising means for mixing together into a curable mixture liquid plastics components to be moulded, said mixing means having an outlet orifice through which the liquid components emerge, a pouring member formed with two or more passageways, at least one of which, at any one time, is in an operating position in which it is operable to transfer the material therethrough from the mixing means into a mould, means for indexing the passageways at regular intervals such that, at any one time, at least one passageway is out of use, and means for cleaning cured accumulated portions of the liquid plastics components from the at least one passageway which is out of use so that after such cleaning, the at least one passageway become available for re-use.

2. Apparatus as claimed in claim 1 wherein said pouring member comprises a wheel having said passageways formed therein, and wherein said indexing means comprises means for rotating said wheel in a stepwise fashion to bring the passageways into the operating position.

3. Apparatus as claimed in claim 2 wherein said passageways are spaced at equal angular intervals around said wheel.

4. Apparatus as claimed in claim 2 or claim 3, wherein the passageways are parallel with each other and with the axis of the wheel.

5. Apparatus as claimed in claim 2 or claim 3 wherein the passageways extend radially about the wheel.

6. Apparatus as claimed in claim 5 wherein the passageways are provided in an annular portion of said wheel and open at opposite ends respectively into the inner and the outer peripheral surfaces of said annular portion.

7. Apparatus as claimed in claim 6 wherein each said passageways comprises an open groove formed in a surface of said wheel, and wherein means are provided for closing said groove to form a closed bore when the passageway is in the operating position.

8. Apparatus as claimed in claim 7 wherein the wheel takes the general shape of a flat disc, and wherein said grooves forming the passageways are formed in a portion of one flat surface of said disc, which portion forms said annular portion of the wheel.

9. Apparatus as claimed in claim 8 comprising further cleaning means for cleaning said portion of one flat surface of the disc in order to prevent build-up of cured material.

10. Apparatus as claimed in claim 1 wherein said cleaning means comprises a plunger, together with first means for moving said plunger into a passageway to be cleaned in order to push from the passageway any build-up of cured material, and second means for retracting said plunger from the passageway after ejection of cured material.

11. Apparatus as claimed in claim 10 wherein said plunger is hollow and is equipped at its end with a nozzle, whereby, during retraction of the plunger, release agent may be sprayed onto the interior of the passageway from the nozzle.

12. An apparatus for reaction molding of plastic materials, comprising:
means for mixing together into a curable mixture liquid plastic components to be molded, said mixing means having an outlet oriface through which the mixture emerges;
means, including a pouring member having a plurality of passageways, for transferring the mixture of liquid plastic components through at least one selected passageway among said plurality of passageways, from said oriface to a mold, said pouring member being movable into respective positions in which respective ones of said passageways are communicable with said oriface and a mold to transfer the mixture for said oriface to the mold; and
means for indexing said pouring member at regular intervals to bring said pouring member into each of said respective positions, at least one of said plurality of passageways being positioned out of communication with said oriface in each of said respective positions of said pouring member; and means for cleaning the passageways of cured portions of said mixture accumulated therein while positioned out of communication with said oriface.

13. An apparatus as in claim 12, wherein said pouring member includes a wheel, said wheel having said passageways formed therein, said indexing means comprising means for rotating said wheel in stepwise fashion to successively bring said passageways into communication with said oriface.

14. An apparatus as in claim 10, wherein said cleaning means is fixed so that said passageways are indexed in turn into registry therewith at a sufficient distance from said operating position that built-up material therein has sufficiently cured before said passageways are in registry with said cleaning means to be removable by said plunger.

* * * * *